T 864,002

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JULY 15, 1969

864 O.G. 729

735,175

POLYUREA BONDED SAND FOUNDRY CORES

Martin Luther Brown, Elkton, Md., and Ward Jepson Remington, West Chester, Pa., assignors to E. I. du Pont de Nemours and Company, Wilmington, Del., a corporation of Delaware

Filed June 7, 1968. Published July 15, 1969
Int. Cl. C08g *51/04;* B29c *1/06*
U.S. Cl. 260—37
No Drawing. 15 Pages Specification

A process for the preparation of foundry sand cores which allows adequate working time but does not require the usual baking step. The cores are prepared by mixing foundry sand with ingredients which form a polyurea binder resin within the mass in a reasonable time at ordinary temperatures, shaping the mix and allowing it to set. The polyurea binder ingredients are (1) a solution of an aromatic polyisocyanate in a non-protonating solvent (described in U.S. Patent 3,317,481) sufficient to provide 0.075–1.2 parts by weight of isocyanate groups per 100 parts of sand, (2) a source of water at least sufficient to convert the isocyanates to ureas, preferably an inorganic salt hydrate such as trisodium phosphate dodecahydrate and (3) a catalyst for the isocyanate water reaction such as tertiary aliphatic amines and organotin compounds. The preferred aromatic polyisocyanates have a functionality greater than two and can be condensation products of aromatic diisocyanates with polyols such as trimethylol propane or glycerol or phosgenation products of polyamine mixtures such as the crude condensation products of formaldehyde and aniline (see U.S. Patent 2,683,730). The cores have excellent properties, attaining a scratch hardness of 60 or more in 30–600 minutes at ambient temperatures with as little as 0.75 part of binder mixture per 100 parts of sand.